Figure 1:
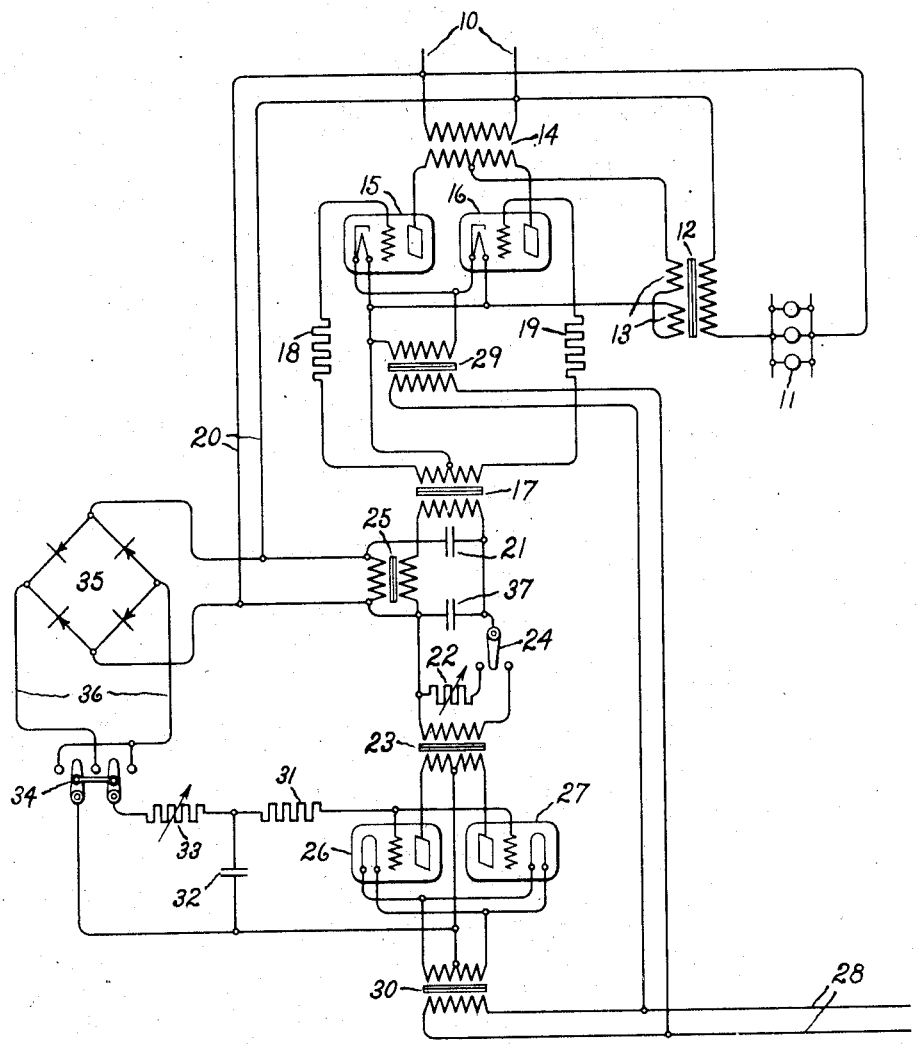

June 13, 1933.  A. S. FITZ GERALD  1,914,201

ELECTRIC CONTROL SYSTEM

Filed Oct. 2, 1930

Inventor:
Alan S. Fitz Gerald,
by Charles N. Mullen
His Attorney.

Patented June 13, 1933

1,914,201

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

ELECTRIC CONTROL SYSTEM

Application filed October 2, 1930. Serial No. 485,960.

My invention relates to electric control systems and more particularly to such systems which make use of electric valves for controlling the flow of energy from an alternating current source to a load circuit.

Heretofore various arrangements have been proposed for gradually increasing an electric current from zero to its maximum value, or vice versa. These arrangements have usually included rheostats, induction regulators or similar apparatus involving moving parts which are subject to wear and other deterioration. Furthermore, these arrangements usually contemplate the regulation over the entire range in a definite number of steps, each of these steps effecting a change of considerable magnitude in the current controlled.

It is an object of my invention to provide an electric control system in which the flow of energy from an alternating current source to a load circuit can be gradually increased or decreased throughout the complete range of regulation and which does not involve the use of any moving parts other than a two-position switch.

It is a further object of my invention to provide an improved electric control system in which the flow of electric current from maximum to minimum may be regulated in an infinite number of imperceptible steps.

According to my invention I provide a pair of electric valves connected in the circuit to be controlled and effect the gradual regulation of current flowing in the circuit by means of a gradual shift in phase of the grid potential with respect to the anode potential of the electric valves. This gradual shift in the phase of the grid potential is accomplished by a static phase shifting circuit, the impedance of one of whose elements is controlled by one or more auxiliary electric valves provided with control elements such as control grids. The control grids of these electric valves are connected across a capacitor which may be gradually charged or discharged through a very high resistance. By charging the capacitor through a resistance, its terminal potential is gradually raised and hence, the potential of the valve grids, with the result that the impedance of the valves is correspondingly decreased. This decrease of impedance of the auxiliary valves varies the impedance of one of the elements of the static phase shifting circuit and thus regulates the current transmitted through the main electric valves. When the capacitor is discharged or charged to an opposite polarity through the same high resistance, the reverse operation takes place.

For a better understanding of my invention together with other and further objects thereof reference is had to the following description taken in connection with the accompanying drawing and its scope will be pointed out in the appended claims.

Figure 2:
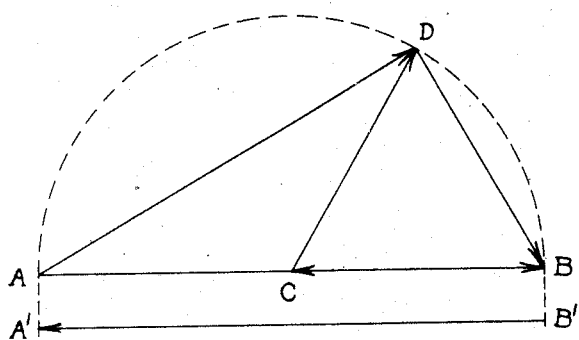

While my invention is of general application in electric circuits, such, for example, as those for starting electric motors, controlling illumination circuits, etc., in Fig 1 of the accompanying drawing I have illustrated my invention as applied to the control of an illumination circuit for dimming and brightening theatre lights, while Fig. 2 is a vector diagram to aid in understanding my invention.

Referring to the drawing, I have illustrated an illumination circuit in which the current supplied to a lamp bank 11 from an alternating current source 10 is controlled by a saturating reactor 12. The saturating winding 13 of the reactor 12 is supplied with direct current from a full-wave controlled rectifier comprising a transformer 14 and electric valves 15 and 16. The saturating winding 13 may be made up of two sections reversely wound, as shown, in order to prevent the inducting of an alternating current in a direct current circuit, from the lamp circuit. The electric valves 15 and 16 may be of any of the several types well known in the art but I prefer to use vapor electric discharge devices in which the starting of current in the valves is controlled by the potential on the control grid, but in which the current in the valve can be interrupted only by reducing the anode potential below its critical value.

The grids of the valves 15 and 16 are excited from the opposite terminals of the secondary winding of a grid transformer 17 through current limiting resistors 18 and 19 respectively and the mid point of this secondary winding is connected to the cathode circuit of the electric valves. The primary winding of the grid transformer is energized from a phase shifting circuit which is supplied from the alternating current source 10 through the conductors 20. This phase shifting circuit may be of any of the several types well known in the art, but I have shown a static phase shifting circuit comprising a capacitor 21 connected in series with either a variable resistor 22 or an impedance device 23, depending upon whether the switch 24 is in its left or right hand position, respectively. A potential substantially half that of the supply line 10 is introduced in the circuit of the primary winding of the transformer 17 by means of a transformer 25. The impedance device 23 comprises a series transformer, the secondary circuit of which is closed through the electric valves 26 and 27. While these valves 26 and 27 may be of any of the several types of electric valves well known in the art, I prefer to use electric valves of the pure electron discharge type in which the flow of current through the device is continuously controlled by the grid potential. I have shown a source of alternating current 28 for heating the filamentary cathodes of the valves 15 and 16, and 26 and 27 through transformers 29 and 30, respectively. The grid circuit of the valves 26 and 27 includes a current limiting resistor 31 and an energy storage element such as a capacitor 32, although it will be obvious to those skilled in the art that a reactor or other energy storage element may be used. The capacitor 32 may be charged from a source of direct current 36 through a switch 34 and a high resistance 33 which is preferably variable. While I have shown the switch 34 as a reversing switch, so that the polarity to which the capacitor 32 is charged depends upon the position of the reversing switch, it will be obvious that the switch 34 may be so connected that the capacitor 32 will be charged to the proper polarity in one position of the switch, while in the other position of the switch the capacitor will discharge merely through the high resistance 33. I have shown the direct current source 36 as derived from a contact rectifier 35 energized from the main alternating current supply 10, but it will be obvious to those skilled in the art that any other source of direct current may be substituted therefor without departing from my invention. In explaining the operation of the above-described system, it will be assumed that switch 34 is in the position shown, that switch 24 is in its right hand position, and that the capacitor 32 is charged to such a potential that the valves 26 and 27 are fully conducting. This potential is dependent upon the characteristics of the valves 26 and 27 which are preferably so chosen as to operate at all times with negative grid potentials. With the valves 26 and 27 approximately fully conducting, the impedance of the series transformer 23 is approximately zero so that the only potential impressed upon the primary winding of the grid transformer 17 is that derived from the transformer 25 which is substantially half that of the potential of the supply source 10 and opposite in phase. However, the transformer connections are such that the grid potentials of the valves 15 and 16 are in phase with their anode potentials and these valves are fully conducting throughout their respective cycles. The maximum current is now delivered to the saturating winding 13 of the reactor 12; the impedance of this reactor is a minimum, and the lamp bank 11 is fully illuminated.

If now the switch 34 be moved to an operating position opposite to that which it last occupied, the capacitor 32 will be charged from the source 36 to a maximum negative potential. As the negative potential of the capacitor 32 applied to the grids of the valves 26 and 27 increases, the impedance of these valves increases with a corresponding increase in impedance of the series transformer 23. The function of the capacitor 37 is to provide a magnetizing current for the transformers 17 and 23 with the result that the impedance of the transformer 23 has substantially a resistance characteristic. As the impedance of the transformer 23 increases, the potential across its primary winding increases and this potential leads the supply potential in phase. The potential applied to the primary winding of the grid transformer 17 is now the resultant of the potentials from the transformers 23 and 25 and this resultant also leads the supply potential. However, the transformer connections are such that the potential supplied by the transformer 17 is lagging with respect to the anode potential of the valves 15 and 16. This will be understood more clearly by reference to the vector diagram shown in Fig. 2 in which the vector AB represents the voltage applied to the phase shifting circuit. The vector A'B' represents the anode potential of the valves 15 and 16; the vector AD, the voltage across the impedance device 23; the vector DB the potential across the capacitor 21; the vector BC the voltage across the secondary of the transformer 25; and the vector CD the potential applied to the grid transformer 17. Since the impedance of the transformer 23 has a resistance characteristic, the locus of the point D will be a semicircle with the vector AB as a diameter, as shown in Fig. 2, and the grid potential of the devices 15 and 16 will lag the anode potential of these devices by an angle varying from the zero to 180° as the impedance of the valves 26 and 27 varies from zero to infinity. With the switch 34 in the position above mentioned, the capacitor 32 will slowly and gradually become negatively charged through the high resistance 33 and, as explained above, the grid potential of the valves 15 and 16 will correspondingly increase its lagging phase shift with a maximum of 180° as a limit. At the same time the amount of current passed by the valves 15 and 16 is correspondingly decreased, the saturation of the reactor 12 is also gradually decreased, and its impedance correspondingly increased, with the result that the lamp bank 11 is slowly and gradually darkened. Obviously, when the switch 34 is reversed, the reverse process takes place and the lamp bank 11 is gradually illuminated. By adjusting the value of the resistor 33, the rate at which the lamps are darkened or illuminated may be conveniently regulated. If the valves 26 and 27 are operated continuously with a negative grid potential, the illumination of the lamp bank 11 may be held constant by opening the switch 34 at any point in the above described cycle. While the charge on the capacitor 32 will gradually leak off, it has been found that the illumination may be maintained substantially constant over a period of several hours. I have shown a manually operable variable resistor 22 which may be connected in place of the series transformer 23 by operating the switch 24 to its left hand position. With this connection it will be obvious that the illumination of the lamp bank 11 is under the complete control of the operator.

While I have shown and described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In an electrical control system the combination of an electric valve, an energy storage element, means for changing at a predetermined rate the energy stored in said element, means responsive to a variation in the energy stored in said element for changing the conductivity of said valve, and a circuit including means whose operating conditions vary continuously in accordance with the conductivity of said valve.

2. In an electric control system, the combination of an electric valve provided with a control element, an energy storage element, means for changing the conductivity of said valve at a predetermined rate comprising a circuit for said control element energized in accordance with the energy stored in said storage element, and a circuit including means whose operating conditions vary continuously in accordance with the conductivity of said valve.

3. In an electrical control system, the combination of a controlling circuit including an electric valve provided with a control grid, an energy storage element, means for changing the conductivity of said valve at a predetermined rate comprising a grid circuit energized in accordance with the energy stored in said storage element, and means for arresting the operation of said conductivity changing means at any desired point to maintain the conductivity of said valve constant.

4. In combination, an electric valve, an energy storage element, means for storing energy in said element at a predetermined rate and for dissipating said energy at a predetermined rate, means for increasing the conductivity of said valve in response to an increase of stored energy and for decreasing the conductivity of said valve in response to a decrease in stored energy, and a circuit including means whose operating conditions vary continuously in accordance with the conductivity of said valve.

5. In combination, an electric valve provided with an anode, a cathode, and a control grid, a circuit between said cathode and grid including a capacitor, means for charging said capacitor at a predetermined rate to increase the conductivity of said valve and for discharging said capacitor at a predetermined rate to decrease the conductivity of said valve, and a circuit including means whose operating conditions vary continuously in accordance with the conductivity of said valve.

6. In combination, a control circuit including an electric valve provided with an anode, a cathode, and a control element, a circuit between said cathode and said control element including a capacitor, means for charging and discharging said capacitor at a predetermined rate to vary the conductivity of said valve, and a circuit including means whose operating conditions vary continuously in accordance with the conductivity of said valve.

7. In combination, a control circuit including an electric valve provided with an anode, a cathode and a control grid, a circuit between said cathode and said grid including a capacitor, means for charging and discharging said capacitor at a predetermined rate to vary the conductivity of said valve, and means for arresting respectively the charging and discharging of said capacitor to maintain constant the conductivity of said valve.

8. In combination, a control circuit including an electric valve provided with an anode, a cathode and a control grid, a circuit between said cathode and said grid including a capacitor, means for charging said capacitor at a predetermined rate comprising a source of direct current and a variable current limiting resistor, and a switch for reversing the polarity of the charging potential.

9. In combination with a source of alternating potential, apparatus for producing a potential variable in phase at a predetermined rate with respect to said source comprising a plurality of impedances serially connected across said source, one of said impedances including the output circuit of an electric valve, an energy storage element associated with said valve means for changing the energy stored in said element, and means responsive to the energy stored in said element for changing the impedance of said valve.

10. In combination with a source of alternating potential, apparatus for producing a potential variable in phase at a predetermined rate with respect to said source comprising a capacitor and an impedance including an electric valve, serially connected across said source, an energy storage element associated with said valve, means for changing the energy stored in said element at a predetermined rate, and means responsive to the energy stored in said element for changing the impedance of said valve.

11. In combination with a source of alternating potential, apparatus for producing a potential variable in phase at a predetermined rate with respect to said source comprising a capacitor and a transformer having its primary winding serially connected with said capacitor across said source, an electric valve connected in a circuit with the secondary winding of said transformer, an energy storage element associated with said valve, means for changing the energy stored in said element at a predetermined rate, and means responsive to the energy stored in said element for changing the impedance of said valve.

12. In an electrical system, the combination of a source of alternating current, a load circuit, apparatus for controlling the flow of energy from said source to said load comprising an electric valve provided with an anode, a cathode, and a control grid, and means for impressing between said grid and cathode a potential variable in phase at a predetermined rate with respect to the anode potential comprising a plurality of impedances serially connected across said source, one of said impedances including a second electric valve, an energy storage element associated with said second valve, means for changing the energy stored in said element, and means responsive to the energy stored in said element for changing the impedance of said second valve.

In witness whereof, I have have hereunto set my hand this thirtieth day of September, 1930.

ALAN S. FITZ GERALD.